United States Patent
Nagao et al.

(10) Patent No.: US 9,358,524 B2
(45) Date of Patent: Jun. 7, 2016

(54) CATALYST STRUCTURE FOR TREATING EXHAUST GAS

(71) Applicants: Honda Motor Co., Ltd., Tokyo (JP); Mitsui Mining & Smelting Co., Ltd., Tokyo (JP)

(72) Inventors: Yuki Nagao, Ageo (JP); Yunosuke Nakahara, Ageo (JP); Yasunori Imada, Ageo (JP); Ohki Houshito, Ageo (JP); Noriaki Iwata, Ageo (JP); Shinichi Tosa, Wako (JP); Syouji Inose, Wako (JP); Masanori Hashimoto, Wako (JP); Tomohiro Ikeda, Wako (JP)

(73) Assignees: Honda Motor Co., Ltd., Tokyo (JP); Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/376,953

(22) PCT Filed: Dec. 28, 2012

(86) PCT No.: PCT/JP2012/084208
§ 371 (c)(1),
(2) Date: Aug. 6, 2014

(87) PCT Pub. No.: WO2013/118425
PCT Pub. Date: Aug. 15, 2013

(65) Prior Publication Data
US 2014/0371058 A1 Dec. 18, 2014

(30) Foreign Application Priority Data
Feb. 7, 2012 (JP) .................................. 2012-023864

(51) Int. Cl.
*B01J 21/00* (2006.01)
*B01J 23/00* (2006.01)
(Continued)

(52) U.S. Cl.
CPC ............. *B01J 23/10* (2013.01); *B01D 53/9445* (2013.01); *B01J 23/002* (2013.01); *B01J 23/63* (2013.01);
(Continued)

(58) Field of Classification Search
CPC ............ B01J 21/00; B01J 21/04; B01J 23/00; B01J 21/06; B01J 21/08; B01J 23/02; B01J 23/10; B01J 23/58; B01J 23/63
USPC ......... 502/300, 332–334, 339, 355, 415, 439, 502/527.12, 527.13, 263, 302–304
See application file for complete search history.

(56) References Cited

U.S. PATENT DOCUMENTS 5,649,894 A * 7/1997 White ...................... A62D 3/33
106/697
6,033,780 A * 3/2000 Nishioka ................. C01B 25/32
106/122

(Continued)

FOREIGN PATENT DOCUMENTS

CN 101204673 A 6/2008
JP 02-056247 2/1990

(Continued)

*Primary Examiner* — Cam N. Nguyen
(74) *Attorney, Agent, or Firm* — The Webb Law Firm (57) ABSTRACT

Provided is a novel catalyst structure capable of maintaining gas diffusivity to a deep part of a catalyst layer even under condition of a high gas flow rate. Proposed is a catalyst structure, which has a porous apatite catalyst layer containing an oxide (hereinafter referred to as "apatite") whose crystalline structure belongs to an apatite type, and in which, in logarithmic differentiation void volume distribution measured by a mercury intrusion porosimeter, a peak top is present within a void volume diameter range of 100 nm to 1000 nm.

15 Claims, 3 Drawing Sheets

(51) Int. Cl.
*B01J 23/08* (2006.01)
*B01J 23/10* (2006.01)
*B01J 23/42* (2006.01)
*B01J 23/44* (2006.01)
*B01J 23/56* (2006.01)
*B01J 23/63* (2006.01)
*B01D 53/94* (2006.01)
*B01J 35/00* (2006.01)
*B01J 35/10* (2006.01)
*B01J 37/02* (2006.01)
*B01J 23/83* (2006.01)
*B01J 23/89* (2006.01)
*B01J 27/18* (2006.01)
*B01J 35/04* (2006.01)

(52) U.S. Cl.
CPC ........... *B01J 23/83* (2013.01); *B01J 23/894* (2013.01); *B01J 35/002* (2013.01); *B01J 35/1066* (2013.01); *B01J 35/1076* (2013.01); *B01J 35/1095* (2013.01); *B01J 37/0244* (2013.01); *B01D 2255/20* (2013.01); *B01D 2255/2045* (2013.01); *B01D 2255/9205* (2013.01); *B01J 23/44* (2013.01); *B01J 27/1806* (2013.01); *B01J 35/0006* (2013.01); *B01J 35/04* (2013.01); *B01J 2523/00* (2013.01); *F01N 2510/06* (2013.01); *Y02T 10/22* (2013.01)

(56) References Cited

U.S. PATENT DOCUMENTS

| | | | |
|---|---|---|---|
| 8,083,844 B2 * | 12/2011 | Arita | A61K 6/033 106/35 |
| 2008/0146439 A1 | 6/2008 | Hanaki et al. | |
| 2008/0254978 A1 | 10/2008 | Kikuchi et al. | |
| 2010/0311575 A1 | 12/2010 | Wakabayashi et al. | |

FOREIGN PATENT DOCUMENTS

| | | |
|---|---|---|
| JP | 05-277375 | 10/1993 |
| JP | 2002-191988 | 7/2002 |
| JP | 2002-253968 | 9/2002 |
| JP | 2004-025013 | 1/2004 |
| JP | 2004-298813 | 10/2004 |
| JP | 2006-110485 | 4/2006 |
| JP | 2006-212527 | 8/2006 |
| JP | 2007-144412 | 6/2007 |
| JP | 2010-005501 | 1/2010 |
| JP | 2010-149015 | 7/2010 |
| JP | 2010-201362 | 9/2010 |
| JP | 2011-016124 | 1/2011 |
| WO | 2014104181 A1 | 7/2014 |

* cited by examiner

CATALYST STRUCTURE FOR TREATING EXHAUST GAS

CROSS-REFERENCE TO RELATED APPLICATIONS

This application is the United States national phase of International Application No. PCT/JP2012/084208 filed Dec. 28, 2012, and claims priority to Japanese Patent Application No. 2012-023864 filed Feb. 7, 2012, the disclosures of which are hereby incorporated in their entirety by reference.

TECHNICAL FIELD

The present invention relates to a catalyst capable of being used to purify an exhaust gas emitted from an internal combustion engine of a two- or four-wheeled vehicle, or the like.

BACKGROUND ART

Three-Way Catalyst

Exhaust gases of internal combustion engines of vehicles or the like using gasoline as fuel include harmful components such as total hydrocarbons (THC), carbon monoxide (CO), and nitrogen oxides (NOx). It is necessary to simultaneously purify and emit the different harmful components using a redox reaction. For example, it is necessary to purify them by oxidizing THC into water and carbon dioxide, by oxidizing CO into carbon dioxide, and by reducing NOx into nitrogen.

As catalysts for treating the exhaust gases from such an internal combustion engine (hereinafter referred to as "exhaust gas purification catalysts"), three-way catalysts (TWCs) enabling reduction-oxidation of CO, THC, and NOx are used. Such a three-way catalyst is typically mounted at an intermediate position of an exhaust pipe between an engine and a muffler in a converter form.

As this type of three-way catalyst, for instance, a catalyst adapted to load a noble metal on a refractory oxide porous body such as an alumina porous body having a wide surface area and to load this on either a substrate, for instance a monolithic substrate made of a refractory ceramic or metal honeycomb structure, or refractory particles is known.

(OSC Material)

The catalysts for purifying the exhaust gases are required to always exert high purification performance even under condition that an air/fuel ratio varies. For this reason, promoters (also called "OSC materials") having an oxygen storage/release capacity function (OSC function) are caused to coexist with noble metals, thereby securing purification performance.

Oxides such as ceria are the OSC materials having the oxygen storage/release capacity because III and IV valences of Ce ions of a crystal lattice thereof are reversibly changed. As these OSC materials are caused to coexist with the noble metals, it is possible to reduce a change in exhaust gas atmosphere and to greatly improve a purification rate.

For example, a catalyst is disclosed in JP H05-277375 A in which a noble metal component is loaded on a wash-coating carrier obtained by coating a carrier with a slurry containing a cerium compound or a zirconium compound along with activated alumina and a nickel compound, and by drying and firing the coated carrier, and then an alkaline earth metal component is loaded on the wash-coating carrier.

(Catalyst Carrier)

Since a bonding force between a noble metal as a catalyst active component and a substrate is not very strong, although the noble metal is directly loaded on the substrate, it is difficult to secure a sufficient loaded amount. Thus, to load a sufficient amount of catalyst active component on a surface of the substrate, the noble metal is loaded on a particulate catalyst carrier having a high specific surface area.

As this type of catalyst carrier, for instance, a porous body composed of a refractory inorganic oxide such as a silica, alumina, or titania compound is known. Above all, activated alumina composed of a mixture of gamma phase alumina and delta phase alumina is a material that particularly has a wide surface area and is excellent as the catalyst carrier.

(Two-Layered Structure)

The three-way catalyst may include a catalyst layer having two layers or more.

The three-way catalyst is used to, for instance, divide a component whose activity is lowered when different functions are given to the respective catalyst layers or are mixed at the same layer.

For example, a low-temperature HC trap catalyst is disclosed in JP H02 56247 A which has two upper and lower catalyst layers on a honeycomb carrier and is configured to use the lower layer as an HC adsorption layer mainly containing zeolite and to use the upper layer as a purification catalyst layer loading a catalyst metal. According to this, an exhaust gas flowing into a carrier cell passage passes through a purification catalyst layer of the upper layer from a face of the cell passage side to a face of the HC adsorption layer of the lower layer and is diffused to the HC adsorption layer. As a result, HCs in the exhaust gas are adsorbed to the zeolite constituting the HC adsorption layer under a low temperature. Thus, if a temperature of the catalyst, more particularly a temperature of the HC adsorption layer, is raised to a certain level of high temperature, for instance to a range of 120° C. to 200° C., with the increase of an exhaust gas temperature, the adsorbed HCs begin to be desorbed, pass through the purification catalyst layer of the upper layer from the HC adsorption layer of the lower layer to the cell passage side, and flow outside the carrier cell passage. Accordingly, in that case, the HCs result in being oxidized and purified into water ($H_2O$) or carbon dioxide ($CO_2$) by catalysis of the catalyst metal when passing through the purification catalyst layer.

A layered catalyst is disclosed in JP 2004-298813 A which has a carrier made of a ceramic or metal material, a first catalyst layer formed on the carrier, and a second catalyst layer formed on the first catalyst layer and is characterized in that the first catalyst layer is formed of a composite ceramic that contains platinum-supported alumina formed by loading a platinum component on porous alumina and a ceria/zirconia composite oxide having an oxygen storage characteristic, and the second catalyst layer is formed of a composite ceramic that contains at least one selected from at least one of a ceria/zirconia composite oxide having a low thermal deterioration characteristic and a rhodium-supported ceria/zirconia composite oxide formed by loading a rhodium component on porous alumina and rhodium-supported alumina, and at least one of the porous alumina and the ceria/zirconia composite oxide having the low thermal deterioration characteristic.

(Gas Diffusivity)

Exhaust gases of a vehicle have a problem that it is difficult for the exhaust gases to be diffused to the inside of a catalyst coating layer, particularly in a high-speed area, because a gas flow rate is high. To resolve such a problem, the following proposal is provided.

For example, an NOx storage/reduction type catalyst is proposed in JP 2002-191988 A and JP 2002-253968 A which causes a noble metal and an NOx storage agent to be loaded on a coating layer made of a porous structure provided with pores having a specified pore diameter, thereby enhancing gas diffusivity of the exhaust gases to improve purification efficiency of NOx.

An exhaust gas purification catalyst is disclosed in JP 2004-025013 A which is composed of a honeycomb-shaped substrate and a catalyst coating layer formed on a surface of the substrate and is characterized in that the catalyst coating layer at least contains powder of an oxygen storage/release material and has pores whose central pore diameter is equal to or greater than 0.1 μm and the pores occupying ±50% of the central pore diameter have a pore volume that is equal to or more than 0.05 cc/g.

A catalyst carrier is disclosed in JP 2006-212527 A which is excellent in gas diffusivity and is characterized by further forming an alumina layer on a surface of a porous body formed by using casting sand as a raw material.

An exhaust gas purification catalyst is disclosed in JP 2006-110485 A in which an exhaust gas catalyst that is at least equipped with a carrier and a plurality of layers formed on the carrier acts as an exhaust gas catalyst that enhances gas diffusivity of exhaust gases in a catalyst layer and improves catalyst efficiency, at least one of the plurality of layers contains a catalyst component, and the corresponding layer is provided therein with voids, average diameters thereof are equal to or more than 0.2 μm and not more than 500 μm.

An exhaust gas purification catalyst of the invention is proposed in JP 2010-149015 A which is characterized in that a catalyst layer made up of a surface layer containing Rh and a first support material including $ZrO_2$ and an inner layer containing Pd and a second support material including MgO is loaded on a carrier.

A catalyst carrier is proposed in JP 2010-201362 A as a catalyst carrier capable of securing sufficient gas diffusivity and suppressing grain growth of a catalyst metal, which is made up of: a silicon carbide-based porous structure having spongy three-dimensional skeleton parts made of silicon carbide-based ceramic and continuous pore parts formed between the three-dimensional skeleton parts; metal silicon layers formed on surfaces of the three-dimensional skeleton parts; and $SiO_2$ layers into which the metal silicon layers are at least partly oxidized and formed.

Patent Document 1: JP H05-277375 A
Patent Document 2: JP H02-56247 A
Patent Document 3: JP 2004-298813 A
Patent Document 4: JP 2002-191988 A
Patent Document 5: JP 2002-253968 A
Patent Document 6: JP 2004-025013 A
Patent Document 7: JP 2006-212527 A
Patent Document 8: JP 2006-110485 A
Patent Document 9: JP 2010-149015 A
Patent Document 10: JP 2010-201362 A As described above, the noble metal showing the catalyst activity is frequently loaded on the activated alumina in the three-way catalyst. However, when the activated alumina is used as the catalyst carrier, this has a problem that the diffusivity of the gases is reduced in proportion to a deep part of the catalyst layer. Especially, if a gas flow rate is increased by enhancing the number of revolutions of an engine in order to enhance a speed, there is a problem in that the gas diffusivity is remarkably deteriorated, and the purification rate is reduced.

Accordingly, the invention provides a new catalyst structure capable of maintaining gas diffusivity to a deep part of a catalyst layer even under condition that a gas flow rate is high.

SUMMARY OF THE INVENTION

The invention proposes a catalyst structure, which has a porous apatite catalyst layer containing an oxide (hereinafter referred to as "apatite") whose crystalline structure belongs to an apatite type, and in which, in logarithmic differentiation void volume distribution measured by a mercury intrusion porosimeter, a peak top is present within a void volume diameter range of 100 nm to 1000 nm.

The catalyst structure which the invention proposes is formed to provide a porous apatite catalyst layer containing apatite, and to have a peak top within a void volume diameter range of 100 nm to 1000 nm in logarithmic differentiation void volume distribution measured by a mercury intrusion porosimeter. Thereby, the catalyst structure is adapted to be able to maintain gas diffusivity to a deep part of the catalyst layer even under condition of a high gas flow rate.

BEST MODE(S) FOR CARRYING OUT THE INVENTION

Next, the invention will be described on the basis of embodiments. However, the invention is not limited to the embodiments to be described below.

<Present Catalyst Structure>

A catalyst structure (hereinafter referred to as the "present catalyst structure") as an example of the embodiment of the invention is a catalyst structure equipped with an apatite catalyst layer containing apatite.

Since the present catalyst structure has only to be equipped with the apatite catalyst layer, the apatite catalyst layer may be formed on a surface of, for instance, a substrate, or the apatite catalyst layer may be formed on the surface of the substrate via another layer. Further, the apatite catalyst layer may be provided for a place other than the surface side of the substrate.

When pore distribution of the present catalyst structure is measured by a mercury intrusion porosimeter, in logarithmic differential void volume distribution measured by the mercury intrusion porosimeter, the present catalyst structure has one or two or more peak tops within a void volume diameter range of 100 nm to 1000 nm, particularly preferably equal to or more than 150 nm or not more than 800 nm, and among them, preferably equal to or more than 150 nm or not more than 600 nm.

In this way, the present catalyst structure is formed to have the peak top within the void volume diameter range of 100 nm to 1000 nm. Thereby, it is possible to maintain gas diffusivity to a deep part of the catalyst layer even under condition that a gas flow rate is high, and to enhance a purification rate.

Meanwhile, a line on the assumption that such a peak is not present, that is, a peak whose vertical height is less than 0.002 ml/g from a background, does not correspond to the "peak top" which the invention defines, because it is regarded as a noise of, for instance, a measuring device.

The peak top existing within the void volume diameter range of 100 nm to 1000 nm preferably has a differential pore volume of equal to or more than 0.01 ml/g, particularly equal to or more than 0.05 ml/g or not more than 5 ml/g, and among them, preferably equal to or more than 0.10 ml/g or not more than 2 ml/g.

In the present catalyst structure, the void volume diameter and the differential pore volume of the peak top in the logarithmic differential void volume distribution may be controlled by changing a void volume diameter and a differential pore volume of the apatite constituting the apatite catalyst layer, and furthermore, an amount of the apatite, firing conditions, a thickness of the apatite catalyst layer.

Meanwhile, the mercury intrusion porosimeter is a device that intrudes mercury into a measurement target by applying a pressure to the measurement target using high surface tension of the mercury and measures a void volume diameter and logarithmic differential void volume distribution from the pressure of the moment and an amount of the mercury intruded under the pressure. Accordingly, the target void is only an open pore (void communicating with the outside), excluding a closed pore (independent void).

Further, the "void volume diameter" refers to a diameter of a bottom when the void is approximated to a circular cylinder, and is calculated by the following expression.

$$dr = -4\sigma \cos \theta / p \text{ ($\sigma$: surface tension, $\theta$: contact angle, $p$: pressure)}$$

In this expression, the surface tension of the mercury is known, and the contact angle represents a characteristic value for each device. As such, the void volume diameter can be calculated from the pressure of the mercury intruded under the pressure.

<Substrate>

A material of the substrate used for the present catalyst structure may include a refractory material such as ceramic or a metal material.

The ceramic material for the substrate may include refractory ceramic materials such as cordierite, cordierite-alpha alumina, silicon nitride, zircon mullite, spodumene, alumina-silica magnesia, zirconium silicate, sillimanite, magnesium silicate, zircon, petalite, alpha alumina, and aluminosilicate.

The metal material for the substrate may include refractory metals such as stainless steel or other proper corrosion-resistant alloys based on iron.

A shape of the substrate may include a honeycomb shape, a pellet shape, and a spherical shape.

As a honeycomb material, for instance, a cordierite material such as ceramic may be used. Further, a honeycomb made of a metal material such as ferritic stainless steel may also be used.

When the honeycomb-shaped substrate is used, use may be made of a monolithic substrate having a plurality of fine gas flow passages, that is, channels, inside the substrate in parallel, for instance, so that a fluid flows through the inside of the substrate. In this case, a catalyst layer may be formed on an inner wall surface of each channel of the monolithic substrate by coating such as wash-coating the surface with a catalyst composition.

<Catalyst Layer>

The catalyst layer may be a single layer or a multi-layer having two or more layers. At least one of these layers has only to be an apatite catalyst layer containing an oxide (called "apatite") whose crystal structure belongs to an apatite form.

Further, the "catalyst layer" in the invention refers to a layer having gas adsorption and gas purification catalysis. If the layer contains a catalyst active component, the layer has the gas purification catalysis, and thus corresponds to the catalyst layer. However, the layer may not necessarily contain the catalyst active component.

When the catalyst layer is made up of the multi-layer having two or more layers, the apatite catalyst layer may be one layer or two or more layers. Another layer or two or more other layers may be stacked in a vertical direction of the apatite catalyst layer. In this case, a layer other than the catalyst layer, for instance a layer such as a layer made of porous refractory inorganic oxide powder or a layer made of porous refractory inorganic oxide powder and a promoter component may be present between the catalyst layer and the catalyst layer.

In any case, when the catalyst layer is made up of the multi-layer having two or more layers, the apatite catalyst layer is preferably an outermost surface layer from the viewpoint of increasing the gas diffusivity toward the inner layer.

Further, another catalyst layer different from the apatite catalyst layer may be formed in a flow direction of the exhaust gases.

(Apatite Catalyst Layer)

The apatite catalyst layer is a porous layer containing apatite.

The apatite catalyst layer may contain a catalyst active component in addition to the apatite, and if necessary, an inorganic porous body, an oxygen storage/release capacity (OSC) material, a stabilizer, and the other components.

The apatite catalyst layer is preferably contained at a rate of 20 g to 200 g per 1 liter substrate.

If the content of the apatite catalyst layer is equal to or more than 20 g per 1 liter substrate, it is possible to sufficiently load a noble metal on the apatite catalyst layer. On the other hand, if the content of the apatite catalyst layer is not more than 200 g, it is possible to activate the gas diffusivity of the apatite that is porous.

From such a viewpoint, the content of the apatite catalyst layer is still more preferably equal to or more than 30 g or not more than 150 g per 1 liter substrate, and among them, further preferably equal to or more than 50 g or not more than 120 g.

When the catalyst layer is the multi-layer having two or more layers, a ratio of the apatite catalyst layer to the other layer(s) is preferably 5:1 to 1:20, particularly 3:1 to 1:10, and among them, especially preferably 1:1 to 1:5.

(Apatite)

The apatite which the apatite catalyst layer contains has only to be an oxide whose crystalline structure belongs to an apatite form, and may include, for instance, La-based apatite that is expressed by a general formula of $(La_{a-x}M_x)(Si_{6-y}N_y)O_{27-z}$ (where M indicates the univalent to trivalent cations, N indicates the trivalent to heptavalent cations, $8 \leq a \leq 10$, $0 \leq x \leq 5$, $0 \leq y \leq 3$, and $0 \leq z \leq 2$).

Here, $a=10$ in the case of having a stoichiometric composition, and $a<10$ in the case of having a non-stoichiometric composition. A range of a of the composite oxide that is easily available in practice with regard to the composite oxide having the non-stoichiometric composition and the general formula is expressed by $8 \leq a < 10$.

In the general formula, M is the cation substituting some of La sites, and may include a cation of at least one element selected from the group consisting of, for instance, Ca, Al, Ce, Ba, Sr, Li, Nd, and Pr.

Further, in the general formula, N is the cation substituting some of Si sites. For example, N may include a cation of at least one element selected from the group consisting of Fe, Cu, and Al.

A specific example of this type of La-based apatite may include $La_{9.33}Si_6O_{26}$, $La_{8.33}BaSi_6O_{26}$, $La_{8.33}CaSi_6O_{26}$, $La_{8.33}SrSi_6O_{26}$, $La_{8.33}BaSi_{4.5}Fe_{1.5}O_{26}$, $La_{6.83}Pr_3Si_{4.5}Fe_{1.5}O_{27}$, $La_{7.33}BaYSi_6O_{25.50}$, or the like.

As described above, the void distribution of the apatite forming the apatite catalyst layer affects the apatite catalyst layer and the void distribution of the present catalyst structure. From such a viewpoint, in the logarithmic differential void volume distribution measured by the mercury intrusion porosimeter, the void distribution of the apatite has the peak top within the void volume diameter range of 100 nm to 1000 nm, particularly preferably equal to or more than 150 nm or not more than 800 nm, and among them, preferably equal to or more than 150 nm or not more than 600 nm, and the differential pore volume thereof is 0.05 ml/g to 10 ml/g, particularly equal to or more than 0.1 ml/g or not more than 5 ml/g, and among them, preferably equal to or more than 0.1 ml/g or not more than 2 ml/g.

(Catalyst Active Component)

The metal having the catalyst activity used for the present catalyst structure (including the apatite catalyst layer) may include, for instance, a metal such as palladium (Pd), platinum, rhodium, gold, silver, ruthenium, iridium, nickel, cerium, cobalt, copper, osmium, or strontium.

Especially, the apatite catalyst layer preferably includes platinum (Pt) and palladium (Pd) as the catalyst active component, and among them, preferably contains palladium (Pd). As the apatite catalyst layer contains palladium (Pd) as the catalyst active component, it is possible to increase corrosion resistance of Pd, and particularly a conversion rate of total hydrocarbon (THC).

The content of the catalyst active component included in the apatite catalyst layer is preferably 0.01 to 1.5 mass parts with respect to 100 mass parts of an amount of the apatite included in the catalyst structure. A ratio between the catalyst active component and the apatite is controlled to be such a percentage. Thereby, it is possible to prevent sintering of the catalyst active component to increase dispersibility.

From such a viewpoint, the content of the catalyst active component included in the apatite catalyst layer is still more preferably equal to or more than 0.05 mass parts or not more than 1.5 mass parts with respect to 100 mass parts of the amount of the apatite included in the catalyst structure, and among them, further preferably equal to or more than 0.1 or not more than 1.0 mass parts.

The content of the catalyst active component in the present catalyst structure (including the apatite catalyst layer) is preferably 0.1 to 15 g per 1 liter substrate.

As the catalyst active component is contained within such a range, the exhaust gases are adapted to be purified.

However, if the catalyst active component is increased, this leads to a rise in product price. As such, it is difficult to use a great deal of catalyst active component.

From such a viewpoint, the content of the catalyst active component in the present catalyst structure (including the apatite catalyst layer) is still more preferably equal to or more than 0.2 g or not more than 12 g per 1 liter substrate, and among them, further preferably equal to or more than 0.3 g or not more than 10 g.

Further, the content of the catalyst active component in the apatite catalyst layer is preferably 0.01 to 2 mass % of the apatite catalyst layer.

As the catalyst active component is contained within such a range, the active component is loaded on the apatite, and the activity is adapted to be obtained. However, if the catalyst active component is increased, this leads to a rise in product price. As such, it is difficult to use a great deal of catalyst active component.

From such a viewpoint, the content of the catalyst active component in the apatite catalyst layer is still more preferably equal to or more than 0.05 mass % or not more than 2 mass % of the apatite catalyst layer, and among them, further preferably equal to or more than 0.1 mass % or not more than 1.5 mass %.

Further, the catalyst active component may be dissolved in a catalyst carrier such as alumina and exist as a solid solution, or may be loaded on a catalyst carrier such as alumina and exist in that state.

(Inorganic Porous Body)

In the present catalyst structure, the apatite catalyst layer, the catalyst layer other than the apatite catalyst layer, or the layer that is not the catalyst layer may contain an inorganic porous medium as a catalyst carrier.

Such an inorganic porous medium may include a porous body of a compound selected from the group consisting of, for instance, silica, alumina, and titania compounds, and more particularly a porous body made of a compound selected from the group consisting of, for instance, alumina, silica, silica-alumina, alumino-silicates, alumina-zirconia, alumina-chromia, and alumina-ceria.

As alumina among them, alumina, for instance, $\gamma$-, $\delta$-, $\theta$-, or $\alpha$-alumina, whose a specific surface area is larger than 50 $m^2/g$ may be used. Above all, $\gamma$- or $\theta$-alumina is preferably used. Alternatively, to enhance heat resistance of the alumina, a trace of La may be contained.

A lattice of the alumina is preferably pre-stabilized by alkaline earth metal oxide, silicon dioxide, zirconium dioxide, or oxide of a rare earth group.

Meanwhile, when an amount of the alumina is too much relative to the apatite, an amount of macropore (pore diameter of 100 nm to 1000 nm) of the apatite is relatively reduced. As such, a ratio of the content of the apatite to the content of the alumina contained in the same layer is preferably equal to or more than 1, particularly equal to or more than 3 or not more than 30, and among them, preferably equal to or more than 6 or not more than 20.

(OSC Material)

In the present catalyst structure, the apatite catalyst layer, the catalyst layer other than the apatite catalyst layer, or the layer that is not the catalyst layer may contain a promoter (OSC material) having oxygen storage capacity (OSC).

Such an OSC material may include, for instance, a cerium compound, a zirconium compound, and a ceria-zirconia composite oxide.

However, when the apatite catalyst layer does not contain the OSC material, particularly the ceria-zirconia composite oxide, this is preferable because it is possible to increase the purification efficiency of exhaust gases. An exact mechanism is unclear, but it can be considered to be, when the apatite catalyst layer contains the OSC material, because the OSC material blocks pores, or because oxidation reactions of CO and HC proceed selectively, resulting in that the purification efficiency of NOx is lowered.

(Stabilizer and the Other Components)

In the present catalyst structure, the apatite catalyst layer, the catalyst layer other than the apatite catalyst layer, or the layer that is not the catalyst layer may contain a stabilizer and the other components.

The stabilizer may include, for instance, an alkaline earth metal or an alkali metal. Especially, the stabilizer may be selected from one or two of metals selected from the group consisting of magnesium, barium, boron, thorium, hafnium, silicon, calcium, and strontium. Among them, barium is preferable in terms of the fact that a temperature at which PdOx is reduced is highest, that is, that PdOx is resistant to reduction.

Further, a known additive component such as a binder component may be contained.

As the binder component, an inorganic binder, for instance, a water-soluble solution such as an alumina sol, may be used.

(Constitutional Example of Catalyst Layer)

A preferred constitutional example of the catalyst layer may include a constitutional example in which the apatite-free catalyst layer (lower layer) and the apatite catalyst layer (upper layer) are sequentially formed from a substrate surface or a channel inner wall surface inside the substrate, for instance, when the substrate has a honeycomb shape.

In this case, the lower layer is preferably configured to contain a catalyst active component such as Pd, Pt, or Rh, an inorganic porous body such as alumina, an OSC material such as $Ce$—$ZrO_2$, a binder, and if necessary, a stabilizer such as barium hydroxide, and the apatite catalyst layer that is the upper layer is preferably configured to contain apatite, a catalyst active component such as Pd or Pt, a binder, and if necessary, a stabilizer such as barium hydroxide.

Further, the apatite catalyst layer preferably contains an inorganic porous body such as alumina, and an OSC material such as $Ce$—$ZrO_2$ as needed.

<Manufacturing Method>

An example for manufacturing the present catalyst structure may include a method of mixing and agitating apatite, a catalyst active component, and if necessary, an inorganic porous body, an OSC material, a stabilizer, a binder, and water into a slurry, wash-coating the obtained slurry on, for instance, a substrate such as a ceramic honeycomb body, and firing this to form an apatite catalyst layer on a substrate surface.

Further, when a two-layered catalyst layer is formed, it is only necessary to mix and agitate, for instance, a catalyst active component, an inorganic porous body, an OSC material, a stabilizer, a binder, and water into a slurry, to wash-coat the obtained slurry on, for instance, a substrate such as a ceramic honeycomb body, to fire this to form a catalyst layer for a lower layer on a substrate surface, and to then form an apatite catalyst layer as an upper layer (surface layer) in a similar way as described above.

Further, in the case of the apatite, no macropores are present when a firing temperature is too low, and pores are crushed by sintering when the firing temperature is too high. As such, the firing is preferably carried out at a temperature of 800 to 1200° C.

However, the method for manufacturing the present catalyst structure may employ any known method, and is not limited to the above example.

<Description of Terminology>

In the case of being expressed as the phrase "X to Y" (X and Y are arbitrary numbers) in the specification, the phrase includes the meaning of "preferably more than X" or "preferably less than Y" along with the meaning "equal to or more than X and not more than Y" unless otherwise stated.

Further, in the case of being expressed as the phrase "equal to or more than X" (X is an arbitrary number) or the phase "not more than Y" (Y is an arbitrary number), the phrase also includes the intention of being "preferably more than X" or "preferably less than Y."

EXAMPLES

Hereinafter, the invention will be described in greater detail on the basis of examples and comparative examples.

Example 1

Preparation of Apatite

First, lanthanum nitrite, barium nitrite, yttrium nitrite, and colloidal silica weighted to be a predetermined ratio of $La_{7.33}BaYSi_6O_{25.50}$ were added to pure water, and were agitated to obtain a transparent solution. The transparent solution was dropped into a mixed solution of ammonia water and ammonium carbonate, thereby obtaining a precipitate. The obtained precipitate was aged for 24 hours at 40° C., and then washed with water, filtered, and dried at 100° C., thereby obtaining a precursor. The precursor was fired for 6 hours at 1000° C., thereby obtaining $La_{7.33}BaYSi_6O_{25.50}$ as apatite.

Comparative Example 1

Commercially available $\gamma$-$Al_2O_3$ was prepared.

Example 2

90.5 mass parts of the apatite ($La_{7.33}BaYSi_6O_{25.50}$) obtained in Example 1 above were added to 1.5 mass parts of a palladium nitrate solution in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of $\Phi$105.7 mm×L114.3 mm-400 cells, and was then subjected to a drying process and a firing process for 1 hour at 500° C.

Further, a Pd application quantity was 70 g/cft, and a wash-coating quantity was 160 g/L.

Comparative Example 2

90.5 mass parts of La stabilization alumina were added to 1.5 mass parts of a palladium nitrate solution in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of $\Phi$105.7 mm×L114.3 mm-400 cells, and was then subjected to a drying process and a firing process for 1 hour at 500° C.

Further, a Pd application quantity was 70 g/cft, and a wash-coating quantity was 160 g/L.

Comparative Example 3

55.0 mass parts of $CeO_2$—$ZrO_2$-based composite oxide, 29.3 mass parts of La stabilization alumina, and barium acetate having a quantity corresponding to 7.0 mass parts in terms of barium carbonate were added to a palladium nitrate solution corresponding to 0.7 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, a Pd application quantity was 20 g/cft, and a wash-coating quantity was 100 g/L.

Example 3

Lower Layer

A Pd-containing slurry was obtained similar to Comparative Example 3. Like Comparative Example 3, the obtained Pd-containing slurry was applied to a cordierite honeycomb substrate of Φ105.7 mm×L114.3 mm-400 cells, and was then subjected to a firing process.

Upper Layer

Next, 92.0 mass parts of the apatite ($La_{7.33}BaYSi_6O_{25.50}$) obtained in Example 1 above were added to pure water, and was subjected to a wet pulverizing process. Then, an alumina sol as an inorganic binder was added by 8.0 mass parts, thereby obtaining a slurry.

The obtained slurry was applied to the cordierite honeycomb substrate on which the lower layer was applied and formed as described above, and was then subjected to a drying process and a firing process for 1 hour at 500° C.

Further, a wash-coating quantity was 70 g/L in an upper layer.

Example 4

Lower Layer

Like Example 3, a lower layer was formed on a cordierite honeycomb substrate of Φ105.7 mm×L114.3 mm-400 cells.

Upper Layer

Similar to Example 3, an upper layer was formed, except that a wash-coating quantity was 150 g/L.

Example 5

Lower Layer

Like Example 3, a lower layer was formed on a cordierite honeycomb substrate of Φ105.7 mm×L114.3 mm-400 cells.

Upper Layer

Similar to Example 3, an upper layer was formed, except that a wash-coating quantity was 200 g/L.

Example 6

Lower Layer

Like Example 3, a lower layer was formed on a cordierite honeycomb substrate of Φ105.7 mm×L114.3 mm-400 cells.

Upper Layer

Similar to Example 3, an upper layer was formed, except that a wash-coating quantity was 300 g/L.

Comparative Example 4

Lower Layer

Like Example 3, a lower layer was formed on a cordierite honeycomb substrate of Φ105.7 mm×L114.3 mm-400 cells.

Upper Layer

Next, 92.0 mass parts of La stabilization alumina were added to pure water, and were subjected to a wet pulverizing process. Then, an alumina sol as an inorganic binder was added by 8.0 mass parts, thereby obtaining a slurry.

The obtained slurry was applied to the cordierite honeycomb substrate on which the lower layer was applied and formed as described above, and was then subjected to a drying process and a firing process for 1 hour at 500° C.

Further, a wash-coating quantity was 70 g/L in an upper layer.

Comparative Example 5

Lower Layer

Like Comparative Example 4, a lower layer was formed on a cordierite honeycomb substrate of Φ105.7 mm×L114.3 mm-400 cells.

Upper Layer

Similar to Comparative Example 4, an upper layer was formed, except that a wash-coating quantity was 150 g/L.

Comparative Example 6

Lower Layer

Like Comparative Example 4, a lower layer was formed on a cordierite honeycomb substrate of Φ105.7 mm×L114.3 mm-400 cells.

Upper Layer

Similar to Comparative Example 4, an upper layer was formed, except that a wash-coating quantity was 200 g/L.

Comparative Example 7

Lower Layer

Like Comparative Example 4, a lower layer was formed on a cordierite honeycomb substrate of Φ105.7 mm×L114.3 mm-400 cells.

Upper Layer

Similar to Comparative Example 4, an upper layer was formed, except that a wash-coating quantity was 300 g/L.

Example 7

Lower Layer 55.0 mass parts of $CeO_2$—$ZrO_2$-based composite oxide, 29.7 mass parts of La stabilization alumina, and barium acetate having a quantity corresponding to 7.0 mass parts in terms of barium carbonate were added to a palladium nitrate solution corresponding to 0.3 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, a Pd application quantity was 15 g/cft, and a wash-coating quantity was 160 g/L.

Upper Layer

Next, 84.7 mass parts of the apatite ($La_{7.33}BaYSi_6O_{25.50}$) obtained in Example 1 above and barium acetate having a quantity corresponding to 7.0 mass parts in terms of barium carbonate were added to a palladium nitrate solution corresponding to 0.3 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C. Further, in an upper layer, a Pd application quantity was 5 g/cft, and a wash-coating quantity was 70 g/L.

Example 8

Lower Layer

Like Example 7, a lower layer was formed on a cordierite honeycomb substrate of Φ105.7 mm×L114.3 mm-400 cells.

Upper Layer

Next, 64.7 mass parts of the apatite ($La_{7.33}BaYSi_6O_{25.50}$) obtained in Example 1 above, 20.0 mass parts of $CeO_2$—$ZrO_2$-based composite oxide, and barium acetate having a quantity corresponding to 7.0 mass parts in terms of barium carbonate were added to a palladium nitrate solution corresponding to 0.3 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 5 g/cft, and a wash-coating quantity was 70 g/L.

Example 9

Lower Layer 55.0 mass parts of $CeO_2$—$ZrO_2$-based composite oxide, 28.9 mass parts of La stabilization alumina, and barium acetate having a quantity corresponding to 7.0 mass parts in terms of barium carbonate were added to a palladium nitrate solution corresponding to 1.1 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, in a lower layer, a Pd application quantity was 50 g/cft, and a wash-coating quantity was 160 g/L.

Upper Layer

Next, 84.0 mass parts of the apatite ($La_{7.33}BaYSi_6O_{25.50}$) obtained in Example 1 above and barium acetate having a quantity corresponding to 7.0 mass parts in terms of barium carbonate were added to a palladium nitrate solution corresponding to 1.0 mass part in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 20 g/cft, and a wash-coating quantity was 70 g/L.

Example 10

Lower Layer

Like Example 9, a lower layer was formed on a cordierite honeycomb substrate of Φ105.7 mm×L114.3 mm-400 cells.

Upper Layer

Next, 78.0 mass parts of the apatite ($La_{7.33}BaYSi_6O_{25.50}$) obtained in Example 1 above, 6.0 mass parts of La stabilization alumina, and barium acetate having a quantity corresponding to 7.0 mass parts in terms of barium carbonate were added to a palladium nitrate solution corresponding to 1.0 mass part in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 20 g/cft, and a wash-coating quantity was 70 g/L.

Example 11

Lower Layer

Like Example 9, a lower layer was formed on a cordierite honeycomb substrate of Φ105.7 mm×L114.3 mm-400 cells.

Upper Layer

Next, 72.0 mass parts of the apatite ($La_{7.33}BaYSi_6O_{25.50}$) obtained in Example 1 above, 12.0 mass parts of La stabilization alumina, and barium acetate having a quantity corresponding to 7.0 mass parts in terms of barium carbonate were added to a palladium nitrate solution corresponding to 1.0 mass part in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 20 g/cft, and a wash-coating quantity was 70 g/L.

Example 12

90.9 mass parts of the apatite $(La_{7.33}BaYSi_6O_{25.50})$ obtained in Example 1 above was added to a palladium nitrate solution corresponding to 1.1 mass parts in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, a Pd application quantity was 50 g/cft, and a wash-coating quantity was 160 g/L.

Example 13

83.3 mass parts of the apatite $(La_{7.33}BaYSi_6O_{25.50})$ obtained in Example 1 above and barium acetate having a quantity corresponding to 7.6 mass parts in terms of barium carbonate were added to a palladium nitrate solution corresponding to 1.1 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, a Pd application quantity was 50 g/cft, and a wash-coating quantity was 160 g/L.

Example 14

75.7 mass parts of the apatite $(La_{7.33}BaYSi_6O_{25.50})$ obtained in Example 1 above and barium acetate having a quantity corresponding to 15.2 mass parts in terms of barium carbonate were added to a palladium nitrate solution corresponding to 1.1 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, a Pd application quantity was 50 g/cft, and a wash-coating quantity was 160 g/L.

Example 15

99.5 mass parts of the apatite $(La_{7.33}BaYSi_6O_{25.50})$ obtained in Example 1 above was added to a palladium nitrate solution corresponding to 0.5 mass parts in terms of a Pd metal, and was subjected to a wet pulverizing process, thereby obtaining a Pd-containing slurry. Then, the Pd-containing slurry was subjected to a drying process and a firing process for 1 hour at 500° C.

Example 16

99.0 mass parts of the apatite $(La_{7.33}BaYSi_6O_{25.50})$ obtained in Example 1 above was added to a palladium nitrate solution corresponding to 1.0 mass part in terms of a Pd metal, and was subjected to a wet pulverizing process, thereby obtaining a Pd-containing slurry. Then, the Pd-containing slurry was subjected to a drying process and a firing process for 1 hour at 500° C.

Example 17

98.5 mass parts of the apatite $(La_{7.33}BaYSi_6O_{25.50})$ obtained in Example 1 above was added to a palladium nitrate solution corresponding to 1.5 mass parts in terms of a Pd metal, and was subjected to a wet pulverizing process, thereby obtaining a Pd-containing slurry. Then, the Pd-containing slurry was subjected to a drying process and a firing process for 1 hour at 500° C.

Example 18

98.0 mass parts of the apatite $(La_{7.33}BaYSi_6O_{25.50})$ obtained in Example 1 above was added to a palladium nitrate solution corresponding to 2.0 mass parts in terms of a Pd metal, and was subjected to a wet pulverizing process, thereby obtaining a Pd-containing slurry. Then, the Pd-containing slurry was subjected to a drying process and a firing process for 1 hour at 500° C.

Example 19

Lower Layer 55.0 mass parts of $CeO_2$—$ZrO_2$-based composite oxide, 28.7 mass parts of La stabilization alumina, and barium acetate having a quantity corresponding to 7.0 mass parts in terms of barium carbonate were added to a palladium nitrate solution corresponding to 1.3 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, in a lower layer, a Pd application quantity was 60 g/cft, and a wash-coating quantity was 160 g/L.

Upper Layer

Next, 91.5 mass parts of the apatite $(La_{7.33}BaYSi_6O_{25.50})$ obtained in Example 1 above was added to a palladium nitrate solution corresponding to 0.5 mass parts in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 10 g/cft, and a wash-coating quantity was 70 g/L.

Example 20

Lower Layer 55.0 mass parts of $CeO_2$—$ZrO_2$-based composite oxide, 28.9 mass parts of La stabilization alumina, and barium acetate having a quantity corresponding to 7.0 mass parts in terms of barium carbonate were added to a palladium nitrate solution corresponding to 1.1 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, in a lower layer, a Pd application quantity was 50 g/cft, and a wash-coating quantity was 160 g/L.

Upper Layer

Next, 91.0 mass parts of the apatite ($La_{7.33}BaYSi_6O_{25.50}$) obtained in Example 1 above was added to a palladium nitrate solution corresponding to 1.0 mass part in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 20 g/cft, and a wash-coating quantity was 70 g/L.

Example 21

Lower Layer 55.0 mass parts of $CeO_2$—$ZrO_2$-based composite oxide, 29.1 mass parts of La stabilization alumina, and barium acetate having a quantity corresponding to 7.0 mass parts in terms of barium carbonate were added to a palladium nitrate solution corresponding to 0.9 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, in a lower layer, a Pd application quantity was 40 g/cft, and a wash-coating quantity was 160 g/L.

Upper Layer

Next, 90.5 mass parts of the apatite ($La_{7.33}BaYSi_6O_{25.50}$) obtained in Example 1 above was added to a palladium nitrate solution corresponding to 1.5 mass parts in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 30 g/cft, and a wash-coating quantity was 70 g/L.

Example 22

Lower Layer 55.0 mass parts of $CeO_2$—$ZrO_2$-based composite oxide, 29.3 mass parts of La stabilization alumina, and barium acetate having a quantity corresponding to 7.0 mass parts in terms of barium carbonate were added to a palladium nitrate solution corresponding to 0.7 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, in a lower layer, a Pd application quantity was 30 g/cft, and a wash-coating quantity was 160 g/L.

Upper Layer

Next, 90.0 mass parts of the apatite ($La_{7.33}BaYSi_6O_{25.50}$) obtained in Example 1 above was added to a palladium nitrate solution corresponding to 2.0 mass parts in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 40 g/cft, and a wash-coating quantity was 70 g/L.

Example 23

Lower Layer 48.9 mass parts of $CeO_2$—$ZrO_2$-based composite oxide, 35.8 mass parts of La stabilization alumina, and barium acetate having a quantity corresponding to 6.2 mass parts in terms of barium carbonate were added to a palladium nitrate solution corresponding to 1.1 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of Φ105.7 mm×L114.3 mm-400 cells, and was then subjected to a drying process and a firing process for 1 hour at 500° C.

Further, in a lower layer, a Pd application quantity was 56 g/cft, and a wash-coating quantity was 180 g/L.

Upper Layer

Next, 91.0 mass parts of the apatite ($La_{7.33}BaYSi_6O_{25.50}$) obtained in Example 1 above was added to a palladium nitrate solution corresponding to 1.0 mass part in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 14 g/cft, and a wash-coating quantity was 50 g/L.

Example 24

Lower Layer 62.9 mass parts of $CeO_2$—$ZrO_2$-based composite oxide, 20.0 mass parts of La stabilization alumina, and barium acetate having a quantity corresponding to 8.0 mass parts in terms of barium carbonate were added to a palladium nitrate solution corresponding to 1.1 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of $\Phi 105.7$ mm×L114.3 mm-400 cells, and was then subjected to a drying process and a firing process for 1 hour at 500° C.

Further, in a lower layer, a Pd application quantity was 44 g/cft, and a wash-coating quantity was 140 g/L.

Upper Layer

Next, 91.0 mass parts of the apatite ($La_{7.33}BaYSi_6O_{25.50}$) obtained in Example 1 above was added to a palladium nitrate solution corresponding to 1.0 mass part in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 26 g/cft, and a wash-coating quantity was 90 g/L.

Example 25

Lower Layer 73.3 mass parts of $CeO_2$—$ZrO_2$-based composite oxide, 8.3 mass parts of La stabilization alumina, and barium acetate having a quantity corresponding to 9.3 mass parts in terms of barium carbonate were added to a palladium nitrate solution corresponding to 1.1 mass parts in terms of a Pd metal, and were subjected to a wet pulverizing process. Then, an alumina sol as an inorganic binder was added by 8.0 mass parts, thereby obtaining a Pd-containing slurry.

The obtained Pd-containing slurry was applied to a cordierite honeycomb substrate of $\Phi 105.7$ mm×L114.3 mm-400 cells, and was then subjected to a drying process and a firing process for 1 hour at 500° C.

Further, in a lower layer, a Pd application quantity was 39 g/cft, and a wash-coating quantity was 120 g/L.

Upper Layer

Next, 91.0 mass parts of the apatite ($La_{7.33}BaYSi_6O_{25.50}$) obtained in Example 1 above was added to a palladium nitrate solution corresponding to 1.0 mass part in terms of a Pd metal, and was subjected to a wet pulverizing process. Then, an alumina sol as an inorganic binder was added by 8.0 mass parts, thereby obtaining a Pd-containing slurry.

The obtained Pd-containing slurry was applied to the cordierite honeycomb substrate on which the lower layer was applied and formed as described above, and was then subjected to a drying process and a firing process for 1 hour at 500° C.

Further, in an upper layer, a Pd application quantity was 31 g/cft, and a wash-coating quantity was 110 g/L.

<Measurement of Logarithmic Differential Void Volume Distribution>

Measurement of logarithmic differential void volume distribution is a method of changing a pressure applied to mercury, and measuring an amount of the mercury penetrating into pores on this occasion, thereby measuring pore (void) distribution.

Assuming that a pressure is given as P, that a pore diameter is given as D, and that a contact angle and surface tension of the mercury are given as $\theta$ and $\sigma$ respectively, a condition under which the mercury can intrude into the pores may be expressed from an equilibrium of force by $PD=-4\sigma \cos\theta$. In this case, if the contact angle and the surface tension are constants, the pressure P and the pore diameter D into which the mercury can intrude on this occasion are in inverse proportion. For this reason, the pressure P and a liquid volume V to intrude on this occasion are measured by changing the pressure, and the transverse axis P of the obtained P-V curve is replaced from such a formula by the pore diameter with no change, so that it is possible to find the pore distribution.

The measurement was performed on the following conditions in the following procedure using an automatic porosimeter "AutoPore IV9520" manufactured by Shimadzu Co. Ltd. as a measuring device.

(Measurement Conditions)
Measurement environment: 25° C.
Measurement cell: sample chamber volume of 3 cm$^3$, and intrusion volume of 0.39 cm$^3$
Measurement range: from 0.0048 MPa to 255.106 MPa
Measurement point: 131 points (where the points were carved to be at equal intervals when the pore diameter was applied by the logarithm)
Intrusion volume: adjusted to be equal to or more than 25% and not more than 80%.
(Low-Pressure Parameters)
Exhaust pressure: 50 μmHg
Exhaust time: 5.0 min
Mercury injection pressure: 0.0034 MPa
Equilibrium time: 10 secs
(High-Pressure Parameter)
Equilibrium time: 10 secs
(Mercury Parameters)
Advance contact angle: 130.0 degrees
Retreat contact angle: 130.0 degrees
Surface tension: 485.0 mN/m (485.0 dynes/cm)
Mercury density: 13.5335 g/mL
(Measurement Procedure)
(1) Weighing about 0.15 g of catalyst powder or about 0.5 g of a honeycomb to perform measurement.
(2) Measuring 46 points at a low pressure part within a range from 0.0048 MPa to 0.2068 MPa.
(3) Measuring 85 points at a high pressure part within a range from 0.2241 MPa to 255.1060 MPa.
(4) Calculating pore diameter distribution from a mercury injection pressure and a mercury injection quantity.

Further, (2), (3), and (4) above were automatically performed by software installed in the device.

<Method of Evaluating Catalyst Performance>

Aging was carried out for 24 hours while periodically circulating a gas, into which $C_3H_6$ and $O_2$ are mixed so as to have a complete combustion ratio, for 90 seconds and then ventilating air for 10 seconds, with the aforementioned catalyst set in an electric furnace maintained at 1000° C.

Purification performance of the catalyst was performed by circulating a gas, into which CO, $CO_2$, $C_2H_6$, $H_2$, $O_2$, NO, $H_2O$, and a balance $N_2$ were mixed so as to have a complete combustion ratio, so as to be SV=100,000 $h^{-1}$ and measuring outlet gas components at a temperature of 100 to 500° C. using a CO/HC/NO analyzer.

A temperature (hereinafter, T50) that reached a 50% purification rate of each of CO/HC/NO and a purification rate (hereinafter, η400) at 400° C. were obtained from obtained temperature-purification rate data, and catalyst performance of each sample was compared.

Further, in Example 2 and Comparative Example 2, when a temperature was 350° C., A/F=14.6, and SV=60,000 $h^{-1}$, 100,000 $h^{-1}$, 150,000 $h^{-1}$, 200,000 $h^{-1}$, 250,000 $h^{-1}$, the purification rates of CO, HC, and NOx were measured.

In Examples 3 to 6 and 19 to 22 and Comparative Examples 3 to 7, when a temperature was 350° C., A/F=14.6, and SV=250,000 $h^{-1}$, the purification rates of CO, HC, and NOx were measured.

In Examples 7, 8, and 12 to 14, when a temperature was 400° C., A/F=14.6, and SV=100,000 $h^{-1}$, the purification rates of CO, HC, and NOx were measured.

In Examples 9 to 11, 20, and 23 to 25, when a temperature was 400° C., A/F=14.6, and SV=100,000 $h^{-1}$, 150,000 $h^{-1}$, 200,000 $h^{-1}$, 250,000 $h^{-1}$, the purification rates of CO, HC, and NOx were measured.

<Pd Dispersion Degree Evaluation Based on CO Adsorption Method>

Aging was carried out for 25 hours while periodically circulating a gas, into which $C_3H_6$ and $O_2$ are mixed so as to have a complete combustion ratio, for 80 seconds and then ventilating air for 20 seconds, with the aforementioned catalyst set in an electric furnace maintained at 1000° C. Then, a Pd dispersion degree was estimated from a CO adsorption amount and Pd loaded amount of catalyst powder after the aging.

<Results and Considerations>

Figure 1:
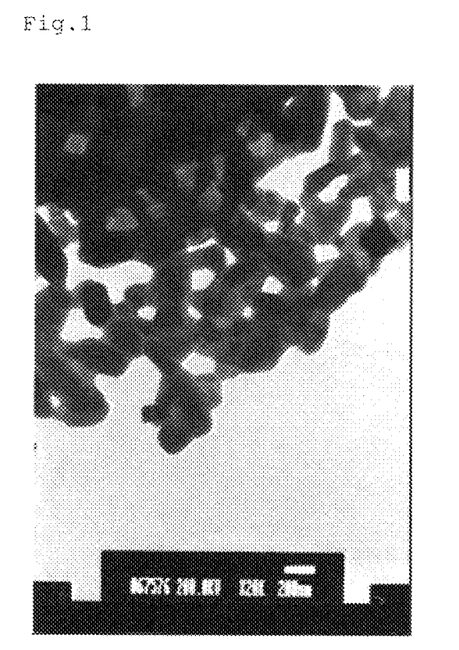
FIG. 1 is a TEM photograph of apatite prepared in Example 1.
Figure 2:
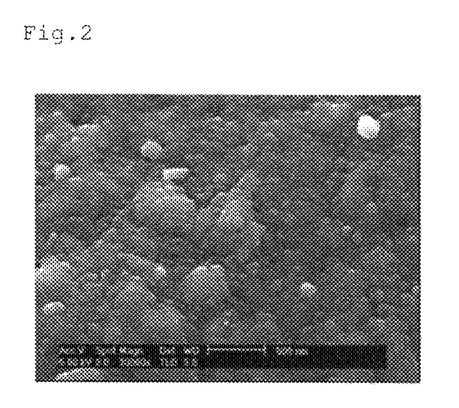
FIG. 2 is a SEM photograph of γ-$Al_2O_3$ prepared in Comparative Example 1.
Figure 3:
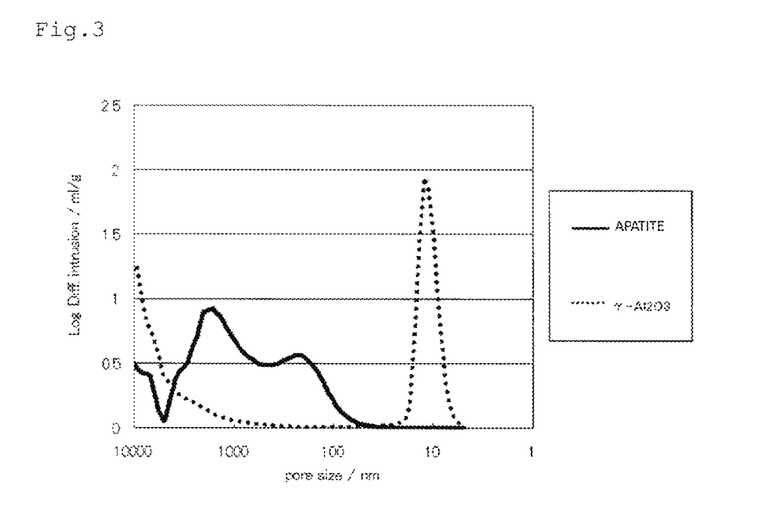
FIG. 3 is a diagram showing logarithmic differential void volume distribution (pore distribution) of apatite prepared in Example 1 and γ-$Al_2O_{37}$ prepared in Comparative Example 1, wherein the logarithmic differential void volume distribution is measured by a mercury intrusion porosimeter.

FIG. 1 shows a TEM photograph of the apatite prepared in Example 1. FIG. 2 shows a SEM photograph of $\gamma$-$Al_2O_3$ prepared in Comparative Example 1. FIG. 3 is a diagram showing logarithmic differential void volume distribution (pore distribution) of apatite and $\gamma$-$Al_2O_3$ which is measured by a mercury intrusion porosimeter (may also be abbreviated to an "Hg porosimeter").

Seeing FIG. 1, it was found that the apatite of Example 1 had a three-dimensional mesh structure and pores of about 100 nm to 1000 nm. In contrast, it was found that $\gamma$-$Al_2O_3$ (FIG. 2) of Comparative Example 1 did not have such macropores and such a three-dimensional mesh structure.

Further, seeing measurement results of the Hg porosimeter of FIG. 3, it was found that the apatite of Example 1 had a feature of having a peak top within a void volume diameter range of 100 nm to 1000 nm, whereas $\gamma$-$Al_2O_3$ of Comparative Example 1 had no peak top within such a range.

Further, in the apatite of Example 1, the peak top existing within the void volume diameter range of 100 nm to 1000 nm had a differential pore volume that was at least 0.05 ml/g.

Figure 4:
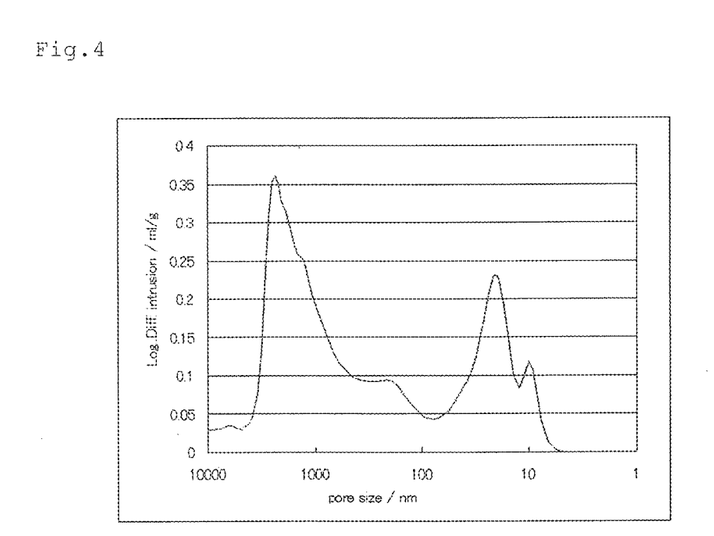
FIG. 4 is a diagram showing logarithmic differential void volume distribution (pore distribution) of a catalyst structure prepared in Example 7, wherein the logarithmic differential void volume distribution is measured by the mercury intrusion porosimeter.
Figure 5:
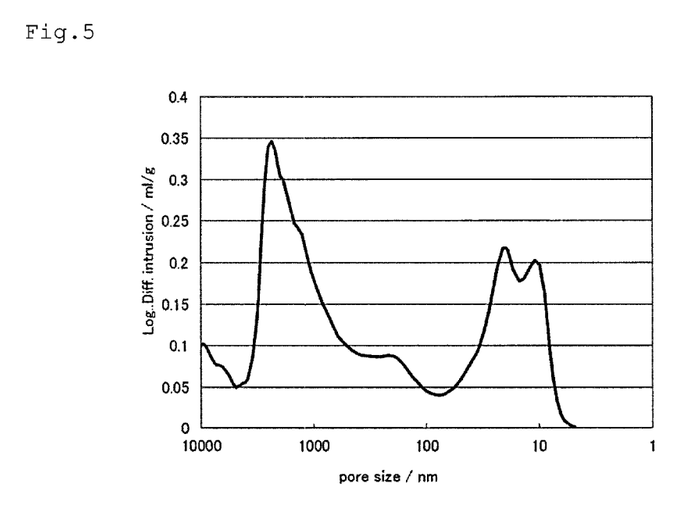
FIG. 5 is a diagram showing logarithmic differential void volume distribution (pore distribution) of a catalyst structure prepared in Example 11, wherein the logarithmic differential void volume distribution is measured by the mercury intrusion porosimeter.

Next, FIGS. 4 and 5 are diagrams showing logarithmic differential void volume distribution (pore distribution), of the catalyst structures prepared in Examples 7 and 11, measured by an Hg porosimeter.

Further, in FIG. 4, the peak top existing within the void volume diameter range of 100 nm to 1000 nm had a height L from a background B which was 0.023 ml/g. The corresponding height L of the peak top of FIG. 5 was 0.020 ml/g.

Table 1 showed results of logarithmic differential void volume distribution (pore distribution) and results of evaluating gas purification performance in Examples and Comparative Examples. Table 2 showed data of purification rates (η350(%)) when SVs of Example 2 and Comparative Example 2 were changed.

In this case, the gas purification performance was evaluated as "A: very good" when the purification rate of HC was equal to or more than 97%, "B (good)" when the purification rate of HC was equal to or more than 90% and less than 97%, and "C (poor)" when the purification rate of HC was less than 90%, and was shown in Table 1 (but, in the case of measuring different SVs, data having the lowest SV was employed).

TABLE 1

| | Position of peak top between 100 nm and 1000 nm | Differential pore volume of peak (ml/g) | Gas purification performance |
|---|---|---|---|
| Example 1 | 242 nm | 0.5616 | — |
| Example 2 | 196 nm | 0.1448 | A |
| Comparative Example 3 | None | None | B |
| Example 3 | 413 nm | 0.0783 | B |
| Example 4 | 416 nm | 0.131 | B |
| Example 5 | 454 nm | 0.1639 | B |
| Example 6 | 486 nm | 0.2298 | B |
| Comparative Example 4 | None | None | B |
| Comparative Example 5 | None | None | B |
| Comparative Example 6 | None | None | B |
| Comparative Example 7 | None | None | C |
| Example 7 | 213 nm | 0.0937 | A |
| Example 9 | 214 nm | 0.0928 | A |
| Example 10 | 213 nm | 0.0903 | A |
| Example 11 | 212 nm | 0.0879 | B |

TABLE 2

| Catalyst specification | | CO SV ($h^{-1}$) | | | | | HC SV ($h^{-1}$) | | | | |
|---|---|---|---|---|---|---|---|---|---|---|---|
| | | 60,000 | 100,000 | 150,000 | 200,000 | 250,000 | 60,000 | 100,000 | 150,000 | 200,000 | 250,000 |
| Example 2 | Pd/Apatite | 99.5 | 95.1 | 91.4 | 83.9 | 84.8 | 99.8 | 96.0 | 91.6 | 82.5 | 80.1 |

TABLE 2-continued

| | | | | | | | | | | |
|---|---|---|---|---|---|---|---|---|---|---|
| Comparative Example 2 | Pd/Al$_2$O$_3$ | 99.2 | 93.5 | 87.3 | 77.3 | 73.4 | 99.7 | 94.7 | 88.2 | 75.1 | 66.7 |

| | Catalyst specification | NOx SV (h$^{-1}$) | | | | |
|---|---|---|---|---|---|---|
| | | 60,000 | 100,000 | 150,000 | 200,000 | 250,000 |
| Example 2 | Pd/Apatite | 98.8 | 83.6 | 72.1 | 52.6 | 49.0 |
| Comparative Example 2 | Pd/Al$_2$O$_3$ | 97.0 | 75.6 | 55.6 | 33.5 | 24.9 |

Seeing the results of Table 1, it was confirmed that, in the logarithmic differential void volume distribution measured by the mercury intrusion porosimeter, any catalyst structures obtained in the examples had the peak top within the void volume diameter range of 100 nm to 1000 nm, whereas any catalyst structures obtained in the comparative examples had no peak top within the void volume diameter range of 100 nm to 1000 nm.

Thus, it was confirmed that the catalyst structures of the examples which had the peak top within the corresponding range had high purification performance, compared to those of the comparative examples which had no peak top within the corresponding range.

Further, seeing the results of Table 2, it was found that Example 2 having the apatite catalyst layer was smaller than Comparative Example 2 composed of alumina in terms of a decrease in the purification rate at a high SV, and had good gas diffusion to a catalyst deep part.

Accordingly, taking into consideration the results of the examples and test results so far, it was found that, as the catalyst structure was formed to have the peak top within the void volume diameter of 100 nm to 1000 nm, it is possible to maintain gas diffusivity to a deep part of the catalyst layer even under condition that a gas flow rate is high, and to increase the purification rate.

In this case, in the peak top existing within the void volume diameter of 100 nm to 1000 nm, it could be considered to be preferable that its differential pore volume was preferable equal to or more than 0.01 ml/g, particularly equal to or more than 0.05 ml/g or not more than 5 ml/g, and among them, preferably equal to or more than 0.10 ml/g or not more than 2 ml/g.

Further, it was also found that the catalyst structure as described above could be formed using the apatite including a feature of having the peak top within the void volume diameter range of 100 nm to 1000 nm.

TABLE 3

| | Upper layer coating quantity (g/L) | CO | HC | NOx |
|---|---|---|---|---|
| Comparative Example 3 | 0 | 89.1 | 96.2 | 96.2 |
| Example 3 | 70 | 93.1 | 96.5 | 96.2 |
| Example 4 | 150 | 91.6 | 94.7 | 92.5 |

TABLE 3-continued

| | Upper layer coating quantity (g/L) | CO | HC | NOx |
|---|---|---|---|---|
| Example 5 | 200 | 90.9 | 93.5 | 92.2 |
| Example 6 | 300 | 88.5 | 88.4 | 84.5 |
| Comparative Example 4 | 70 | 93.5 | 96.7 | 97.1 |
| Comparative Example 5 | 150 | 86.7 | 90.4 | 85.1 |
| Comparative Example 6 | 200 | 82.2 | 88.2 | 76.0 |
| Comparative Example 7 | 300 | 71.2 | 77.0 | 62.0 |

Table 3 showed data of purification rates (η350(%)) of Examples 3 to 6 and Comparative Examples 3 to 7 at a high SV.

Seeing the results of Table 3, it was found that the catalyst structures (Examples 3 to 6) having the apatite catalyst layer as the upper layer could maintain a higher purification rate than the catalyst structures of Comparative Examples 3 to 7 even when a thickness of the coating layer, that is, the upper layer and the lower layer, was increased.

It was found that a material such as apatite having macropores of about 100 nm to 1000 nm was used for the upper layer in this way, and thereby the gas diffusion to the lower layer occurred even at the high SV to be able to maintain a high purification rate.

TABLE 4

| | T50 (° C.) | | | η400 (%) | | |
|---|---|---|---|---|---|---|
| | CO | HC | NOx | CO | HC | NOx |
| Example 7 | 291 | 303 | 313 | 86.7 | 97.5 | 77.1 |
| Example 8 | 292 | 304 | 322 | 84.9 | 98.3 | 71.2 |

Table 4 showed results of evaluating simulated exhaust-gas purification performance when the apatite and the OSC material did not coexist in the lower layer (Example 7) and when the apatite and the OSC material coexisted in the lower layer (Example 8).

As a result, it was found that the same layer in which the apatite was contained, that is, the apatite catalyst layer, did not preferably contain the OSC material.

TABLE 5

| | $Al_2O_3$/Apatite ratio | CO SV (h$^{-1}$) | | | | HC SV (h$^{-1}$) | | | | NOx SV (h$^{-1}$) | | | |
|---|---|---|---|---|---|---|---|---|---|---|---|---|---|
| | | 100,000 | 150,000 | 200,000 | 250,000 | 100,000 | 150,000 | 200,000 | 250,000 | 100,000 | 150,000 | 200,000 | 250,000 |
| Example 9 | 0 | 97.6 | 94.3 | 91.5 | 84.9 | 99.5 | 97.5 | 95.2 | 88.9 | 96.2 | 84.1 | 73.3 | 53.2 |
| Example 10 | 1/13 | 96.2 | 92.5 | 90.4 | 85.2 | 98.2 | 95.3 | 92.5 | 87.2 | 88.4 | 76.6 | 67.5 | 53.5 |
| Example 11 | 1/6 | 94.3 | 89.4 | 85.0 | 77.6 | 96.8 | 92.9 | 88.1 | 78.6 | 81.3 | 63.3 | 46.9 | 29.5 |

Table 5 showed results of evaluating simulated exhaust-gas purification performance ($\eta 400(\%)$) when a mixed ratio between apatite and $Al_2O_3$ in the upper layer was changed (Examples 9 to 11).

As a result, it was found that, when $Al_2O_3$ entered the upper layer, the purification rate was reduced, and the purification rate was remarkably reduced in proportion to an increase in amount of $Al_2O_3$. Thus, it was found that the higher SV, the stronger such a tendency. It could be considered that the reason was that, with respect to the apatite three-dimensionally having the three-dimensional mesh structure, $Al_2O_3$ entered, and thereby the gas diffusivity of the apatite was obstructed.

From such a viewpoint, it could be considered to be preferable that a ratio of a content of apatite to a content of alumina, both of which were contained in the same layer, was equal to or more than 1, particularly equal to or more than 3 or not more than 30, and among them, equal to or more than 6 or not more than 20.

TABLE 6

| | Ba/Apatite ratio | T50 (° C.) | | | $\eta 400$ (%) | | |
|---|---|---|---|---|---|---|---|
| | | CO | HC | NOx | CO | HC | NOx |
| Example 12 | 0 | 280 | 294 | 282 | 80.9 | 94.8 | 66.0 |
| Example 13 | 1/11 | 280 | 294 | 285 | 84.3 | 99.2 | 71.2 |
| Example 14 | 1/5 | 304 | 315 | 336 | 80.1 | 97.8 | 66.8 |

Table 6 showed results of evaluating simulated exhaust-gas purification performance when an amount of addition of Ba to the apatite catalyst was changed (Examples 12 to 14).

As a result, it was found that, when Ba was added, $\eta 400$ was improved. However, when Ba was added by an amount at which a Ba/apatite ratio was 1/5, a particularly remarkable decrease occurred at T50.

Conventionally, there was a report that, when Ba was added to the Pd catalyst, Pd sintering was suppressed. However, the Pd/apatite catalyst was also not an exception, and an improvement in performance was confirmed when Ba was added. However, when an amount of addition of Ba is too much, there is a possibility of bringing about an adverse effect. As such, attention is required.

TABLE 7

| | Pd concentration (wt %) | Pd dispersion degree |
|---|---|---|
| Example 15 | 0.5 | 0.011 |
| Example 16 | 1.0 | 0.009 |
| Example 17 | 1.5 | 0.011 |
| Example 18 | 2.0 | 0.002 |

Table 7 showed Pd dispersion degrees of the apatite catalysts (Examples 15 to 18) after aging. Further, a Pd concentration (wt %) in Table 7 shows a percentage (wt %) of a content of Pd contained in the apatite catalyst layer.

It was found that the dispersion degree was high until the Pd concentration amounted to 1.5 wt %, but it was reduced when the Pd concentration was over this value.

TABLE 8

| | Pd concentration (wt %) | CO | HC | NOx |
|---|---|---|---|---|
| Example 19 | 0.5 | 90.4 | 87.8 | 66.4 |
| Example 20 | 1.0 | 90.1 | 88.1 | 64.9 |
| Example 21 | 1.5 | 91.9 | 91.4 | 71.3 |
| Example 22 | 2.0 | 82.3 | 79.2 | 37.3 |

Table 8 showed data of purification rates ($\eta 350(\%)$) of Examples 19 to 22. A Pd concentration (wt %) in Table 8 also shows a percentage (wt %) of a content of Pd contained in the apatite catalyst layer.

As a result, it was also confirmed here that the purification rate was high until the Pd concentration amounted to 1.5 wt %, but it was reduced when the Pd concentration was over this value. Probably, it is believed that, when the apatite has a small specific surface area and a high concentration, the sintering is easily advanced. It was found that the Pd concentration for the apatite was beneficially set to equal to or more than 1.5 wt %.

Taking the results of Tables 7 and 8 into consideration, from the viewpoint of dispersibility and sintering suppression of the catalyst active component, it can be considered to be preferable that, the content of the catalyst active component contained in the catalyst structure is 0.01 to 1.5 mass parts with respect to 100 mass parts of the amount of apatite contained in the catalyst structure, particularly equal to or more than 0.05 mass parts or not more than 1.5 mass parts, and among them, equal to or more than 0.1 mass parts or not more than 1.0 mass part.

TABLE 9

| | Upper layer coating quantity (g/L) | CO SV (h$^{-1}$) | | | | HC SV (h$^{-1}$) | | | | NOx SV (h$^{-1}$) | | | |
|---|---|---|---|---|---|---|---|---|---|---|---|---|---|
| | | 100,000 | 150,000 | 200,000 | 250,000 | 100,000 | 150,000 | 200,000 | 250,000 | 100,000 | 150,000 | 200,000 | 250,000 |
| Example 23 | 50 | 99.8 | 99.5 | 97.8 | 90.3 | 99.9 | 99.4 | 96.9 | 89.2 | 99.9 | 98.2 | 88.4 | 68.2 |
| Example 20 | 70 | 99.9 | 99.5 | 97.7 | 91.5 | 99.9 | 99.3 | 96.5 | 89.8 | 99.9 | 98.1 | 86.7 | 70.0 |

TABLE 9-continued

| | Upper layer coating quantity | CO SV (h$^{-1}$) | | | | HC SV (h$^{-1}$) | | | | NOx SV (h$^{-1}$) | | | |
|---|---|---|---|---|---|---|---|---|---|---|---|---|---|
| | (g/L) | 100,000 | 150,000 | 200,000 | 250,000 | 100,000 | 150,000 | 200,000 | 250,000 | 100,000 | 150,000 | 200,000 | 250,000 |
| Example 24 | 90 | 98.9 | 97.8 | 94.8 | 85.0 | 99.3 | 97.5 | 92.5 | 82.2 | 96.7 | 91.2 | 78.5 | 59.9 |
| Example 25 | 110 | 99.0 | 98.1 | 94.9 | 85.3 | 99.5 | 98.0 | 93.2 | 82.4 | 96.6 | 91.2 | 74.0 | 51.1 |

Table 9 showed results of evaluating simulated exhaust-gas purification performance (η400(%)) of the samples (Examples 20 and 23 to 25) in which a noble metal concentration of the upper layer was made consistent, and a coating quantity was increased.

It was found that, in comparison with Examples 20 and 23, Examples 24 and 25 having a more coating quantity had low performance at a high SV. The apatite has a feature of having a three-dimensional mesh structure and excellent gas diffusion. However, it is believed that, when the coating quantity is much, it is not possible to take advantage of such a feature, and the performance is reduced. For this reason, it can be considered to be preferable that the coating quantity of the upper layer is not more than 80 g/L, and particularly not more than 70 g/L.

The invention claimed is:

1. A catalyst structure, which has a porous apatite catalyst layer containing an oxide having a crystalline structure of apatite type, and in which,
    in logarithmic differentiation void volume distribution measured by a mercury intrusion porosimeter, a peak top is present within a void volume diameter range of 100 nm to 1000 nm.

2. The catalyst structure according to claim 1, wherein a catalyst layer has equal to or more than two layers on a surface of a substrate, and an outermost surface layer of the layers which is equal to or more than two is the apatite catalyst layer.

3. The catalyst structure according to claim 2,
    wherein the catalyst structure contains alumina, and
    a ratio of a content of the apatite to a content of the alumina, both of which are contained in the same layer, is equal to or more than 1.

4. The catalyst structure according to claim 2, wherein the apatite catalyst layer contains no ceria/zirconia composite oxide.

5. The catalyst structure according to claim 2, wherein the apatite catalyst layer contains a catalyst active component whose content is 0.01 to 1.5 mass parts with respect to 100 mass parts of an amount of the apatite contained in the catalyst structure, and wherein the catalyst active component is a metal having catalyst activity for the apatite catalyst layer.

6. The catalyst structure according to claim 5, wherein the catalyst active component includes palladium, platinum, rhodium, gold, silver, ruthenium, iridium, nickel, cerium, cobalt, copper, osmium, or strontium.

7. The catalyst structure according to claim 1,
    wherein the catalyst structure contains alumina, and
    a ratio of a content of the apatite to a content of the alumina, both of which are contained in the same layer, is equal to or more than 1.

8. The catalyst structure according to claim 7, wherein the apatite catalyst layer contains no ceria/zirconia composite oxide.

9. The catalyst structure according to claim 7, wherein the apatite catalyst layer contains a catalyst active component whose content is 0.01 to 1.5 mass parts with respect to 100 mass parts of an amount of the apatite contained in the catalyst structure, and wherein the catalyst active component is a metal having catalyst activity for the apatite catalyst layer.

10. The catalyst structure according to claim 9, wherein the catalyst active component includes palladium, platinum, rhodium, gold, silver, ruthenium, iridium, nickel, cerium, cobalt, copper, osmium, or strontium.

11. The catalyst structure according to claim 1, wherein the apatite catalyst layer contains no ceria/zirconia composite oxide.

12. The catalyst structure according to claim 11, wherein the apatite catalyst layer contains a catalyst active component whose content is 0.01 to 1.5 mass parts with respect to 100 mass parts of an amount of the apatite contained in the catalyst structure, and wherein the catalyst active component is a metal having catalyst activity for the apatite catalyst layer.

13. The catalyst structure according to claim 12, wherein the catalyst active component includes palladium, platinum, rhodium, gold, silver, ruthenium, iridium, nickel, cerium, cobalt, copper, osmium, or strontium.

14. The catalyst structure according to claim 1, wherein the apatite catalyst layer contains a catalyst active component whose content is 0.01 to 1.5 mass parts with respect to 100 mass parts of an amount of the apatite contained in the catalyst structure, and wherein the catalyst active component is a metal having catalyst activity for the apatite catalyst layer.

15. The catalyst structure according to claim 14, wherein the catalyst active component includes palladium, platinum, rhodium, gold, silver, ruthenium, iridium, nickel, cerium, cobalt, copper, osmium, or strontium.

* * * * *